(12) United States Patent
Su et al.

(10) Patent No.: US 12,490,971 B2
(45) Date of Patent: Dec. 9, 2025

(54) HOLLOW TWO-SECTION IMPLANTATION KNOTLESS SUTURE ANCHOR

(71) Applicant: NATIONAL CHENG KUNG UNIVERSITY, Tainan (TW)

(72) Inventors: Wei-Ren Su, Tainan (TW); Jiu-Zhi Yan, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 691 days.

(21) Appl. No.: 17/877,022

(22) Filed: Jul. 29, 2022

(65) Prior Publication Data
US 2023/0149008 A1 May 18, 2023

Related U.S. Application Data

(60) Provisional application No. 63/227,345, filed on Jul. 30, 2021.

(51) Int. Cl.
*A61B 17/04* (2006.01)
*A61F 2/08* (2006.01)

(52) U.S. Cl.
CPC ........ *A61B 17/0401* (2013.01); *A61F 2/0811* (2013.01); *A61B 2017/0409* (2013.01);
(Continued)

(58) Field of Classification Search
CPC ........ A61B 17/0401; A61B 2017/0409; A61B 2017/0414; A61B 2017/044;
(Continued)

(56) References Cited

U.S. PATENT DOCUMENTS 6,139,565 A * 10/2000 Stone ................. A61B 17/0401
606/232
6,569,186 B1 * 5/2003 Winters ............. A61B 17/1735
606/232

(Continued)

*Primary Examiner* — Kevin T Truong
(74) *Attorney, Agent, or Firm* — Troutman Pepper Locke LLP; Tim Tingkang Xia, Esq.

(57) ABSTRACT

The present invention pertains to a hollow two-section implantation knotless suture anchor which comprises a main body, a tightening element and a taper. The main body comprises a front part, a rear part, a middle part, a first penetration part, a first accommodation space, a first thread, a tapered structure, and a perforation. The tightening element comprises a second penetration part and a second accommodation space. The taper comprises a taper body and a taper head. Moreover, the suture can pass through the perforation on the outside of the main body through the perforation. Afterthat it can pass through the first accommodation space and then the second accommodation space on the outside of the tightening element from the side of the tightening element opposite to the main body. Finally, it can extend on the outside of the main body. Hence, by pulling the ends of the suture, the tightness of the suture tightened by the tightening element and the front part is adjustable. Also, when the taper body of the first penetration and the second penetration is positioned, the taper head is next to the tightening element. Thus, by rotating the taper, both the main body and the tightening element are rotatable.

15 Claims, 24 Drawing Sheets

(52) U.S. Cl.
CPC . *A61B 2017/0414* (2013.01); *A61B 2017/044* (2013.01); *A61B 2017/0445* (2013.01); *A61B 2017/045* (2013.01); *A61F 2002/0829* (2013.01); *A61F 2002/0858* (2013.01); *A61F 2002/0888* (2013.01)

(58) Field of Classification Search
CPC ...... A61B 2017/0445; A61B 2017/045; A61B 2017/00876; A61B 2017/0403; A61B 2017/0412; A61B 2017/0458; A61B 2017/0448; A61B 2017/0496; A61F 2/0811; A61F 2002/0829; A61F 2002/0858; A61F 2002/0888
See application file for complete search history.

(56) References Cited

U.S. PATENT DOCUMENTS

| | | | |
|---|---|---|---|
| 2009/0234387 A1* | 9/2009 | Miller | A61B 17/0401 606/232 |
| 2018/0271514 A1* | 9/2018 | Burkhart | A61B 17/0401 |
| 2019/0029663 A1* | 1/2019 | Gustafson | A61B 17/0401 |
| 2019/0059875 A1* | 2/2019 | Srikumaran | A61B 17/1604 |

* cited by examiner

HOLLOW TWO-SECTION IMPLANTATION KNOTLESS SUTURE ANCHOR

FIELD OF THE INVENTION

The invention pertains to a medical apparatus, in particular, to a suture anchor intended for implantation of bone surgery.

BACKGROUND OF THE INVENTION

An suture anchor is a surgical instrument utilized in the suture of soft tissues such as ligaments. In suture surgery, one end of a suture anchor is secured to a bone by using an suture anchor, and subsequently, the other end is tightened and secured with another suture anchor after the soft issues has been sutured. The current method intended for implanting an suture anchor into bones involves the following steps: the creation of a pilot hole in the bone, the insertion of the suture anchor via a drive rod, and the deployment of the suture anchor utilizing its specific locking mechanism. However, there are certain limitations associated with the current method described above.

The current method for implanting an suture anchor involves pre-drilling a pilot hole in the bone for fixation. Hence, it has to drill a large pilot hole in the bone before the suture anchor being screwed well. Thus, the surrounding tissues are more damaged and the postoperative wound healing is not conductive. Also, the suture anchor is less secured. Thus, the procedure of replacing the pilot hole and the drive rod makes the surgery more tedious and time-consuming. Besides, many of the current suture anchors utilize only a signal fixation mechanism, such as internal fixation or external fixation. Thus, it is impossible to adjust the tightness of the sutures during the period of implanting the suture anchor. Hence, the stability of the fixed sutures is low and it is often loosened after the implantation procedure, which causes a lot of inconvenience. Accordingly, there is an urgent need for an suture anchor that can provide a strong hold on the suture in various bone densities and can allow for adjustment of suture tension during implantation.

SUMMARY OF THE INVENTION

The invention is proposed to provide an suture anchor for orthopedic surgery. The proposed suture anchor provides both external and internal fixation effect. The external fixation ensures a secure fit and clamp the suture between the bone and the suture anchor, and the internal fixation refers to clamping or fixing the suture by the suture anchor itself. Besides, the two-compartment structure of the suture anchor allows for the adjustment of suture tension during the insertion process of the suture anchor. In addition, the hollow design of this suture anchor allows for single-step insertion without pre-drilling a pilot hole in the bone, thus simplifying the implantation process. After being optimally positioned, it is buried thoroughly into the bone.

In order to address the aforementioned limitations, the invention provides a hollow two-section implantation knotless suture anchor. The provided suture anchor comprises a main body, a tightening element and a taper. The main body is a long tubular structure having a front part, a middle part and a rear part along an extension direction. The main body further comprises a first penetration part, a thread, a tapered structure and a perforation. The first penetration part extends from the front part to the rear part along the extension direction and defines a first accommodation space with a non-circular cross section where the taper or the suture can be passed. The thread is positioned on the outer circumference of the main body, and is extended from the middle part to the rear part along the extension direction. The tapered structure is located apart from the thread on the outer circumference of the main body. Also, the tapered structure extends from the front part to the middle part and gradually changes from narrow to wide along the extension direction. The perforation is formed in the tapered structure and connected to the first accommodation space to facilitate suture threading. Optionally, the tightening element is contact with the front part and comprises a second penetration part corresponding to the first penetration part, which defines a second accommodation space for the taper or the suture to pass through. Moreover, after threading the suture through the perforation from the outside of the main body and passing the suture through the first accommodation space, when the suture is threaded through the second accommodation space from one side of the tightening element opposite to the main body on the outside of the tightening element and is extended along the extension direction on the outside of the main body, the tightness of the suture held by the tightening element and the front part can be adjusted by pulling the ends of the suture. The taper comprises a taper body and a taper head located at one end of the taper body. After the taper body has been passed through the first penetration part and the penetration part, the taper head is positioned next to the tightening element. As a result, by rotating the taper, the main body and the tightening element can be rotated.

The invention also pertains to a suture anchor comprises a main body, a tightening element and a taper. The main body is a long tubular structure with a front part, a middle part, and a rear part along an extension direction. Also, the main body comprises a first penetration part, a thread, a tapered structure, and a perforation. The first penetration part extends from the front part to the rear part along the extension direction and defines a first accommodation space with a non-circular cross section, through which the taper or a suture can be inserted. The thread is positioned on the outer circumference of the main body and is extended from the middle part to the rear part along the extension direction. The tapered structure is located on the outer circumference of the main body and is spaced apart from the thread. Also, it is extended from the front part to the middle part and gradually widening along the extension direction. The perforation is located within the tapered structure and connected to the first accommodation space so that the suture can be threaded through it. The tightening element is in optional contact with the front part and comprises a second penetration part corresponding to the first penetration part, which defines a second accommodation space for insertion of the taper or the suture. Moreover, by threading the suture through the perforation, the first accommodation space and the second accommodation space, and by extending it along the outer circumference of the main body, the tightness of the suture held by the tightening element and the front part can be adjusted by pulling the ends of the suture. The taper comprises a taper body and a taper head located at one end of the taper body. Once the taper head is adjacent to the tightening element and the taper body has been inserted through the first penetration part and the penetration part, both the main body and the tightening element can be rotated by rotating the taper.

Optionally, the proposed suture anchor is capable of generating reverser tension. This is achieved by pulling the ends of the suture in the opposite direction of the suture anchor's extension. The reverse tension generated in this manner results in the tightening element pulling the suture securely, thus creating at least two retention points on the contact surface between the front part and the tightening element.

Optionally, at least one trapezoidal structure is formed on the outer circumstance of the tapered structure. Any two neighboring trapezoidal structures are positioned or stacked with each other along the extension direction when there is a plural of trapezoidal structures.

Optionally, the first accommodation space, the second accommodation space and the taper have the same cross section shape. The cross section shape can be regular polygon, rhombus, parallelogram, or gear shape.

Optionally, the length ratio between the tapered structure and the first thread is between 1:1 and 1:10.

Optionally, the tooth shape of the first thread can be square triangle, isosceles triangle, saw tooth, isosceles trapezoid, unequal trapezoid, or square.

Optionally, a tool joint is positioned on one end of the taper body opposite to the taper head, which allows for easy connection with a hand tool or an electric machine to facilitate rotation or tapping of the taper during implantation.

Optionally, a first recess is formed on one side of the taper and is positioned at the same side to the perforation. The first recess defines a third accommodation space for providing accommodation to the suture and is connected to the first accommodation space.

Optionally, a first recess is formed on one side of the taper and a second recess is formed on another side of the taper. The first recess is positioned is positioned at the same side to the perforation, also defines a third accommodation space for providing accommodation to the suture and is connected to the first accommodation space. The second recess defines a fourth accommodation space for providing accommodation to the suture and is connected to the second accommodation space.

Optionally, a first recess is formed on one side of the taper. The first recess defines a third accommodation space for providing accommodation to the suture and is connected to the first accommodation space. Also, optionally, a first recess is formed on one side of the taper and a second recess is formed on another side of the taper. The first recess defines a third accommodation space for providing accommodation to the suture and is connected to the first accommodation space. The second recess defines a fourth accommodation space for providing accommodation to the suture and is connected to the second accommodation space.

In comparison with the conventional methods, the invention has the advantage of offering both external fixation effect and internal fixation effect. The proposed suture anchor addresses the issues faced by patients with osteoporosis, where traditional external fixation suture anchors may not hold the suture effectively and securely with the bone after implantation, and internal fixation suture anchors may become loose after implantation and unavoidably leads to insufficient suture tension. Specifically, it is highly possible that the suture anchor is loosen and detached after the suture anchor being passed into the bone and fixed in only one way. This high possibility causes the suture to be deviated from the intended position of the muscle and the soft tissue. Then, it induces poor performance of the bone surgery even damages the patient's recovery in the future. The invention utilizes both internal fixation and external fixation to facilitate fixation of the suture. Hence, for general patients or patients with osteoporosis, it ensures secure fixation of the suture to the suture anchor itself or between the suture anchor and the bone. This allows for precise suturing of the muscle tissue or the soft tissue in the intended position, resulting in optimal surgical outcomes and post-operative recovery. In addition, after implanting the tapered structure of the suture anchor into the bone, the two-section structure of the suture anchor allows for adjustable suture tension. Thus, it enables the locking of the suture and the suture anchor into the bone in a spiral way and then achieves external fixation. Due to the adjustable feature, more flexibility and room for manipulation during the surgery is provided, and then it can be adjusted appropriately based on patients' individual characteristics.

DETAILED DESCRIPTION OF THE INVENTION

The detailed description and preferred embodiments of the invention are set forth in the following content and provided for people skilled in the art to understand the characteristics of the invention.

Figure 1A:
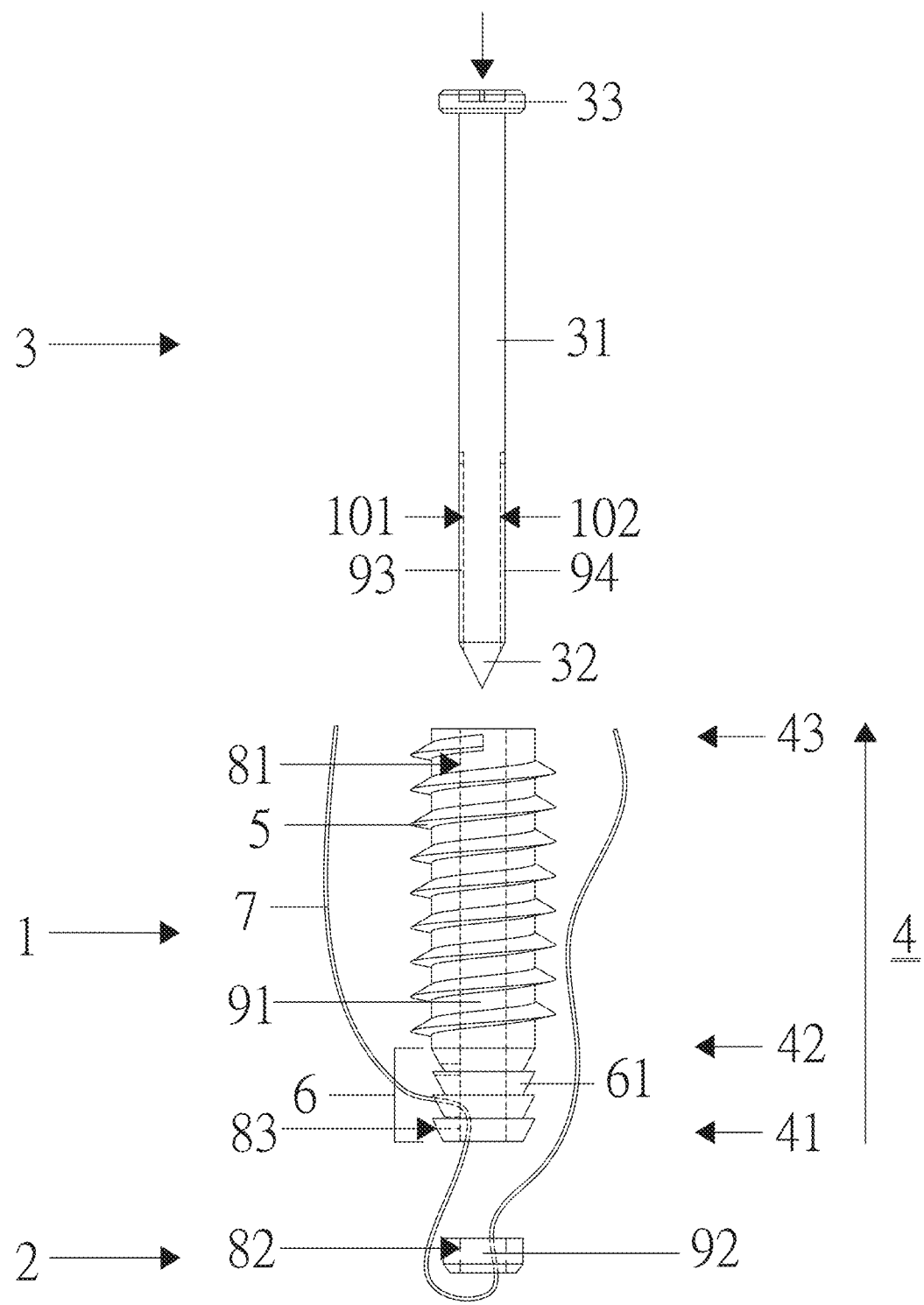
FIG. 1A to FIG. 1B are a series of structural drawings illustrating the first implementation style of the invention.
Figure 1B:
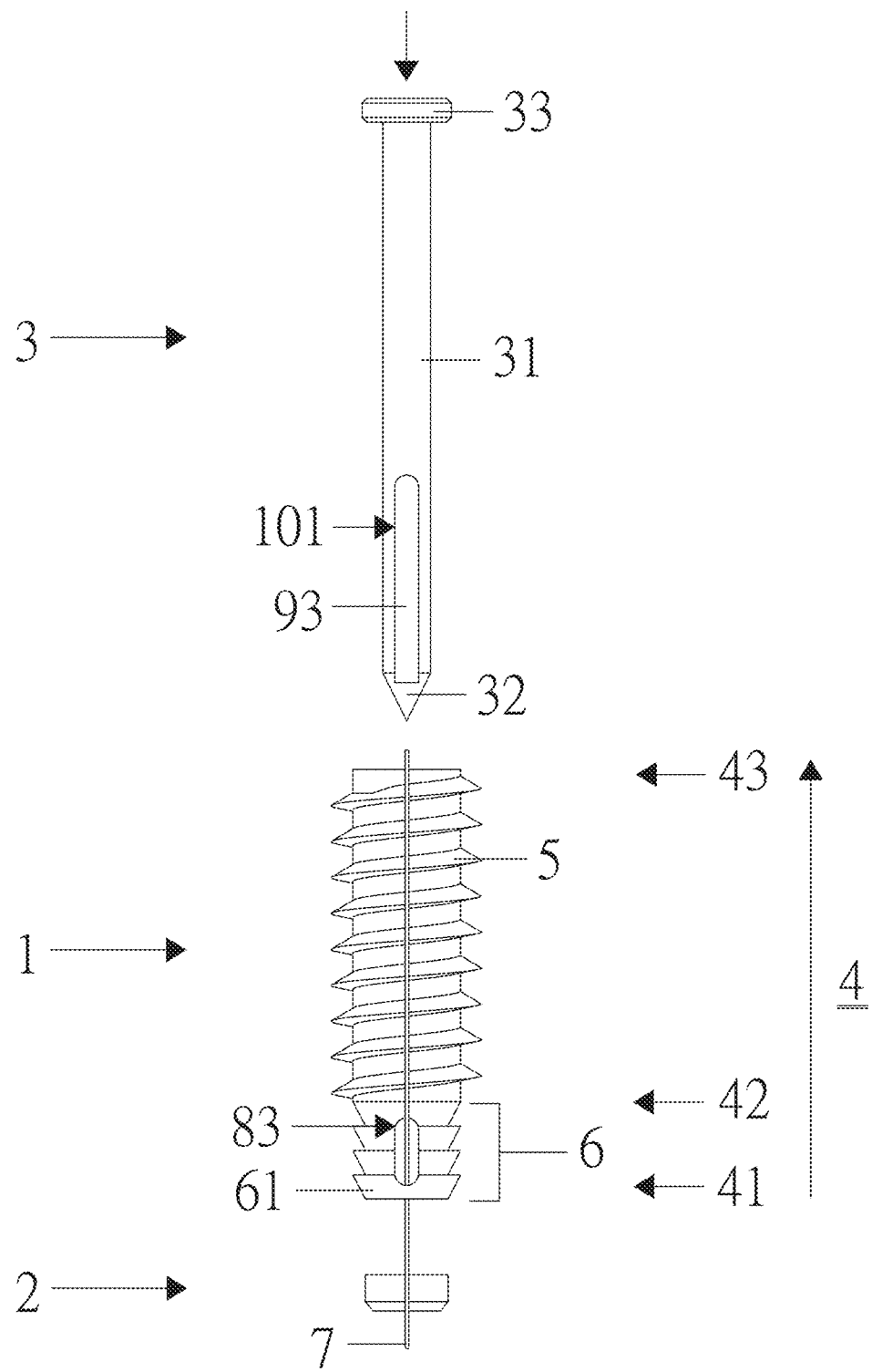

The invention provides a hollow two-section implantation knotless suture anchor. As shown in FIG. 1A and FIG. 1B, the first implementation style comprises a main body 1, a tightening element 2 and a taper 3. The main body 1 is a long tubular structure having a front part 41, a middle part 42, and a rear part 43 positioned along an extension direction 4. The main body 1 further comprises a first penetration part 81, a first thread 5, a tapered structure 6, and a perforation 83. The first penetration part 81 extends from the front part 41 to the rear part 43 along the extension direction 4. The first penetration part 81 defines a first accommodation space 91 with non-circular cross section. The first accommodation space 91 is available for the taper 3 or a suture 7 to be passed. The first thread 5 is positioned on the outer circumference of the main body 1. The first thread 5 is extended from the middle part 42 to the rear part 43 along the extension direction 4. The tapered structure 6 is positioned apart from the first thread 5 on the outer circumference of the main body 1. The tapered structure 7 is extended from the front part 41 to the middle part 42 along the extension direction 4. Also, the tapered structure 6 is gradually widened along the extension direction 4. The perforation 83 is formed in the tapered structure 6 and connected to the first accommodation space 91 that the suture 7 can be threaded. The tightening element 2 can be connected with the front part 41. The tightening element 2 has a second penetration part 82 corresponding to the first penetration part 81. The second penetration part 82 defines a second accommodation space 92 which is available for the taper 3 or the suture 7 to be passed. The tightness of the suture 7 held by the tightening element 2 and the front part 41 can be adjusted by pulling both ends of the suture 7 in a special situation. The special situation is that the suture 7 is passed through the perforation 83 from the outside of the main body 1, the first accommodation space 91, the second accommodation space 92 from the outside of one side of the tightening element 2 opposite to the main body 1 and then extended along the extension direction 4 on the outside of the main body 1 in sequence. The taper 3 comprises a taper body 31 and a taper head 32 positioned on one side of the taper body 31. The rotation of the taper 31 drives rotation of the main body 1 and the tightening element 2 in a special situation. The special situation is that the taper body 31 passes the first penetration part 81 and the second penetration 82 such that the main body 1 is adjacent to the tightening element 2. In one preferred embodiment, the perforation 83 is purposed to suture the suture 7 on both inside and outside of the suture anchor. Thus, when the taper 3 drives the main body 1 or the tightening element 2 to rotate, it can achieve both the internal fixation and the external fixation or can increase overall strength by wounding and tightening the suture 7 at the same time. In another preferred embodiment, to ensure enough strength and rigidity of the taper 3, material of the taper 3 can be metal, such as iron, steel, titanium, aluminum or metal alloy containing the above metals, but is not limited hereto. Thus, the taper 3 can smoothly connect both the main body 1 and the tightening element 2 to be implanted into the bone.

Figure 2A:
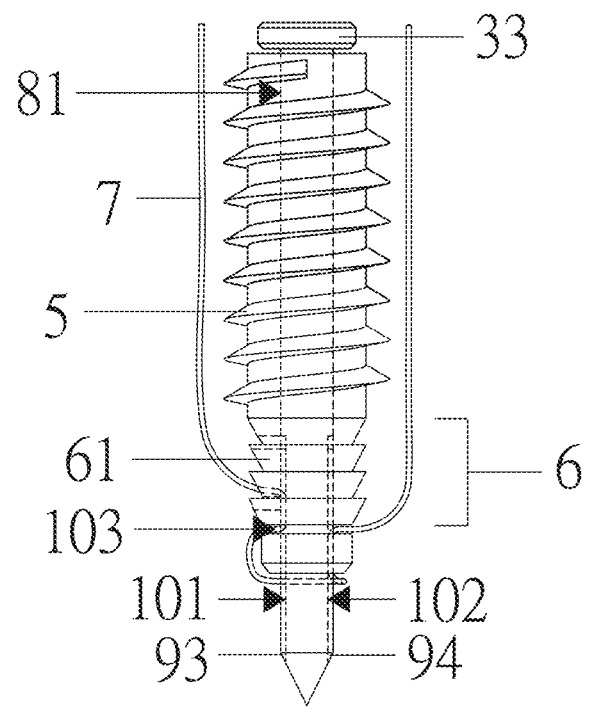
FIG. 2A to FIG. 2D are a series of structural drawings for illustrating the first implementation style with views at various angles to clarify the direction of the suture during threading.
Figure 2B:
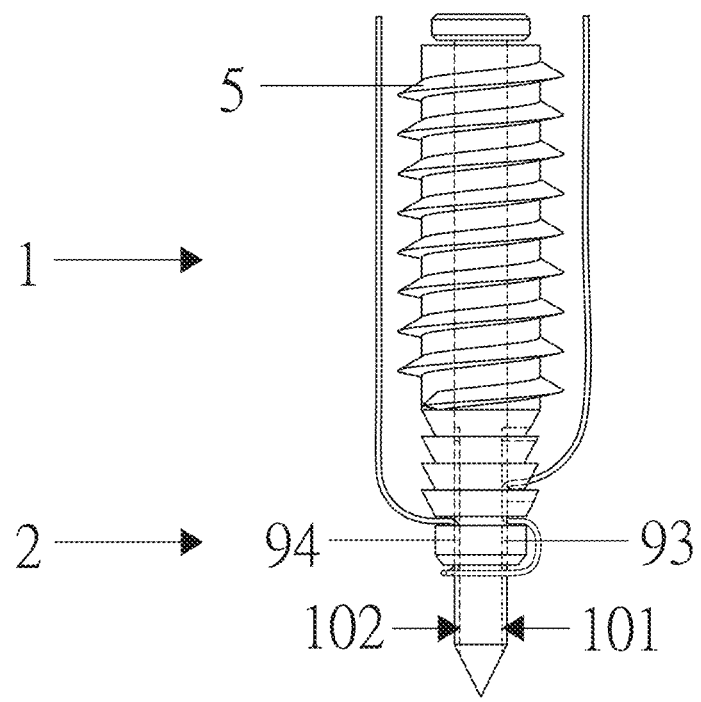
Figure 2C:
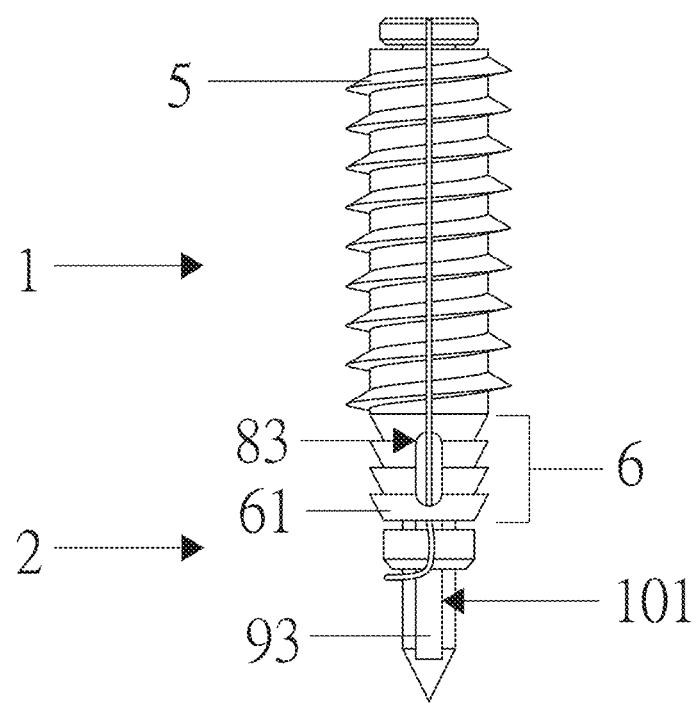
Figure 2D:
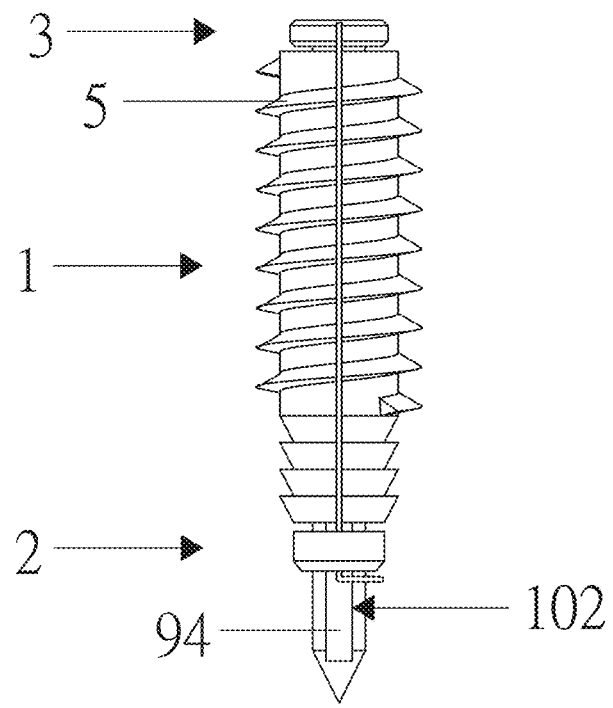

Specifically, in the present implementation style as shown in FIG. 2A, a reverse tension is generated by pulling two ends of the suture 7 in the reverse of the extension direction 4. The reverse tension pulls the tightening element 2 so that the suture 7 is held securely by the tightening element 2 and the front part 41. Also, the suture 7 forms at least two suture retention points 103 on the contact surface between the front part 41 and the tightening element 2. Moreover, the function of lifting the tightening element 2 by the reverse tension is equivalent to the function of applying an upward force to one side of the main body 1 by using the tightening element 2. Hence, both the suture 7 and one side of the tightening element 2 opposite to the main body 1 clamp the suture 7 with the bone to fix the suture 7. Also, due to the mechanism with at least three fixed points, the lifting of the suture 7 and the at least two suture retention points 103 makes the main body 1 and the tightening element 2 more firmly bonded into the bone.

Optionally, to increase the force required to clamp the suture 7, to improve the stability of the suture 7 and to secure the suture 7, it may further comprise a first joint and a second joint paired with the first joint. The former is positioned on one side of the main body 1 close to the tapered structure 6, and the latter is positioned on another side the main body 1 close to the tightening element 2. One option is that the first joint is a convex joint and the second joint is a concave joint. Another option is that the first joint is a concave joint and the second joint is a convex joint. Anyway, the invention is not limited thereto. Understandably, the connection between the first joint and the second joint can be magnetic attraction, screw, mortise, tenon, butt, pivot, or snap joints. Anyway, the invention is not limited thereto.

Optionally, it may further comprise at least one convex part and at least one concave part so as to ensure the suture 7 more stable and hard to loosen. Thus, both the friction between the suture 7 and the bone and the friction between the suture anchors are increased. The convex part is ringed on the outer circumference of the tapered structure 6 for winding the suture 7. The concave part is ringed on the outer circumference of the tapered structure 6 and defines a space. Thus, the suture 7 can be buried in the space while the reinforcement is processed. In one preferred embodiment, it further comprises at least one trapezoidal structure 61 formed on the outer circumstance of the tapered structure 6. When the number of the trapezoidal structure 61 is plural, any two neighboring trapezoidal structures 61 are positioned or stacked with each other along the extension direction 4. Understandably, the trapezoidal structure 61 can be passed into the bone for clamping and fixing the suture 7 with the bone. Thus, the friction between the suture 7, the bone and the suture anchor can be increased. Also, the suture 7 can be held more securely and securely. In another preferred embodiment, because the external fixation is mainly induced by the first thread 5 and the bone to wrap, fit, or clamp the suture 7, the length of the first thread 5 should be not shorter than the tapered structure 6. Thus, the suture anchor is securely implanted into the bone. In one more preferred embodiment, the length ratio between the tapered structure 6 and the first thread 5 is in the range from 1:1 to 1:10, but it is not limited thereto. Understandably, since the first thread 5 is a part utilized to fix, its' length should be not shorted than the length of the tapered structure 6 so as to achieve better fixation effect.

Figure 2E:
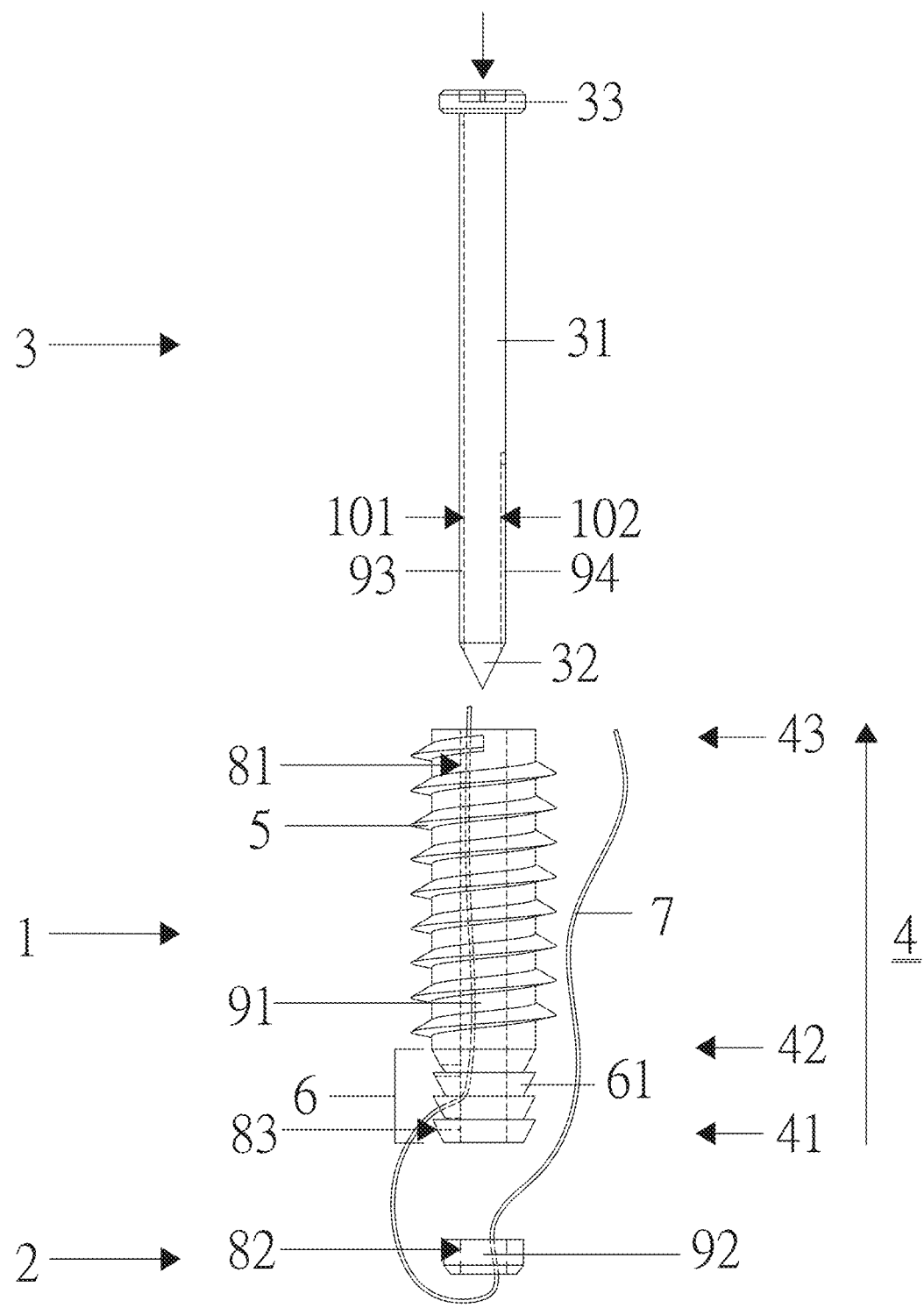
FIG. 2E to FIG. 2F are a series of structural drawings illustrating other threading ways of the first implementation style.
Figure 2F:
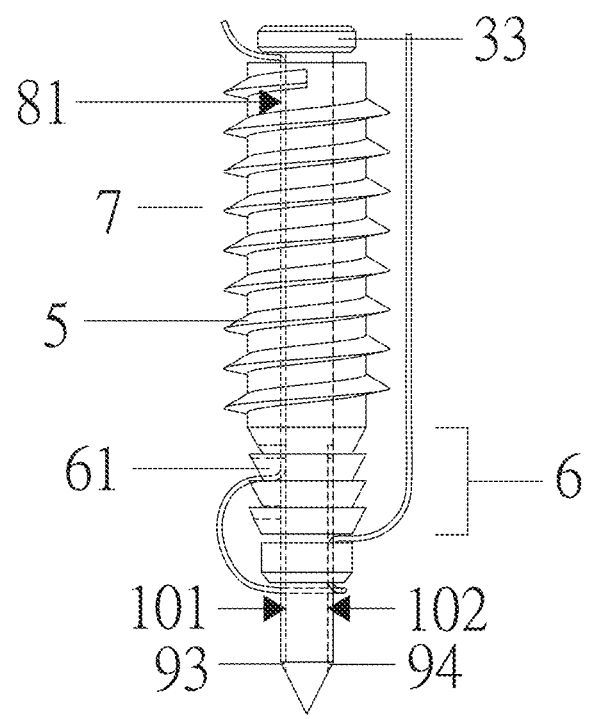

Optionally, as shown in FIG. 2A to FIG. 2D, there are some schematic diagrams of the combination of the invention. These schematic diagrams are useful for clarifying the threading process of the invention from various viewpoints. Specifically, the threading sequence of the first implementation style of the invention can be described as below. Initially, extends the suture 7 from one side of the main body 1 close to the first thread 5 through the rear part 43 to the front part 41. Next, threads the suture 7 through both the perforation 83 and the first penetration part 81 and then out the main body 1 through the front part 41. Then, threads the suture 7 from the outside of the tightening element 2 through the second penetration part 82 on one side of the tightening element 2 opposite to the main body 1. Finally, extends the suture 7 from the outside of the main body 1 through the front part 41 to the back part 43. Hence, when the ends of the suture 7 are pulled secure, the tightening element 2 can be in contact with the main body 1 so as to achieve the internal fixation effect of the suture 7. In one preferred embodiment, since the suture 7 is threaded through the perforation 83, the suture 7 will be wound around the surface of the main body 1 in a spiral manner when the main body 1 is rotated. Thus, the stability and the tightness of the suture 7 is greatly increased, and the suture 7 can be not loosened after the finish of the implantation. In this way, patients may enjoy better treatment results, and surgeons may perform the procedure in a single session without additional adjustments. In another preferred embodiment, as shown in FIG. 2E to FIG. 2F, the threading process of the first implementation style of the invention may further comprises the followings. Initial, moves the suture 7 from one end of the first thread 5 close to the main body 1 to a position corresponding to the perforation 83 in the first accommodation space 91, and then passes it out the outside of the main body 1 through the perforation 83. Next, pass the suture 7 from the outside of tightening element 2 through the second accommodation space 92 on one side of the main body 1 opposite to the tightening element 2. Finally, extends the suture 7 from the outside of the main body 1 through the front part 41 to the read part 43. Hence, when the ends of the suture 7 are pulled secure, the tightening element 2 can be in contact with the main body 1 so as to achieve the internal fixation effect of the suture 7. Understandably, the threading process described above can be reversed as long as the final winding position is equivalent to the above winding position.

Figure 3A:
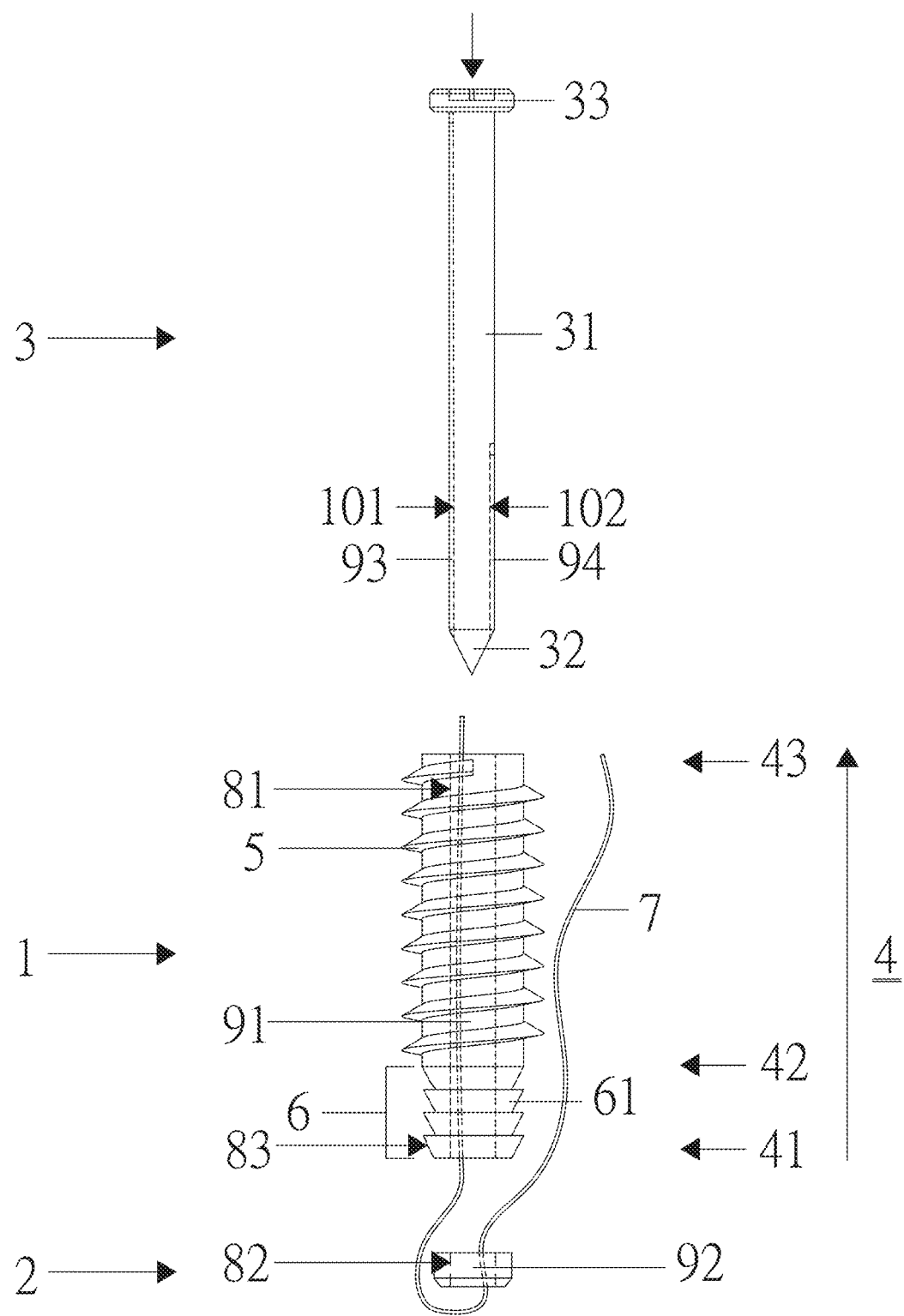
FIG. 3A to FIG. 3B are a series of structural drawings illustrating the second implementation style of the invention.
Figure 3B:
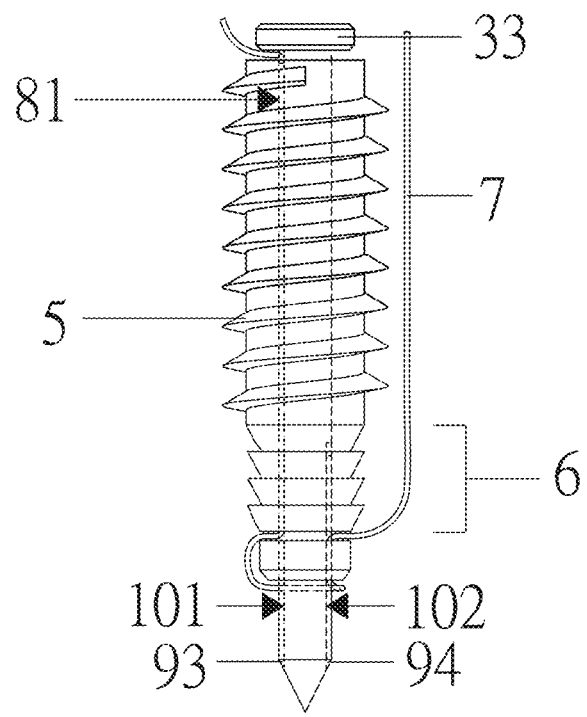
Figure 3C:
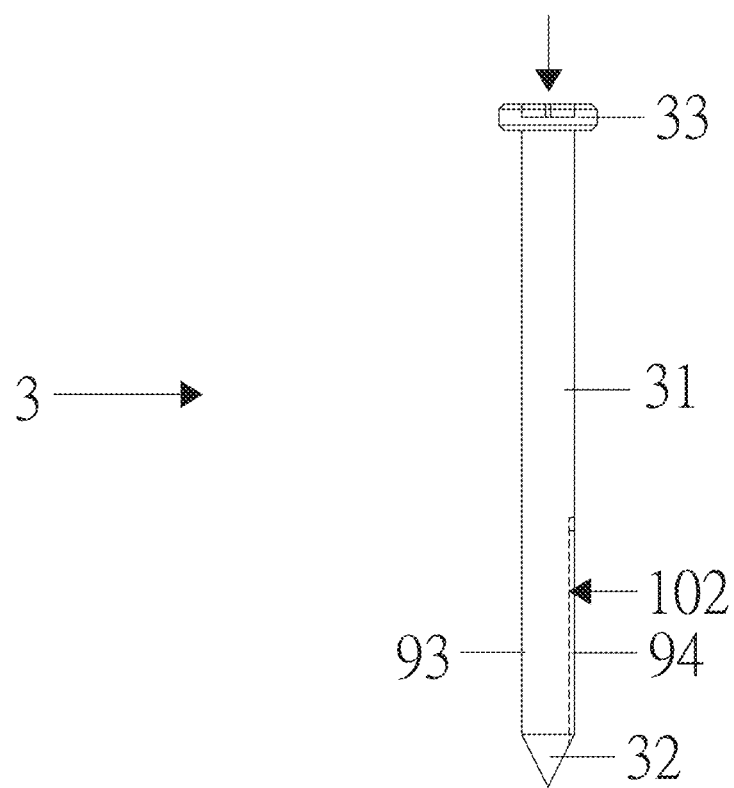
FIG. 3C to FIG. 3D are a series of structural drawings illustrating other threading ways of the second implementation style.
Figure 3C:
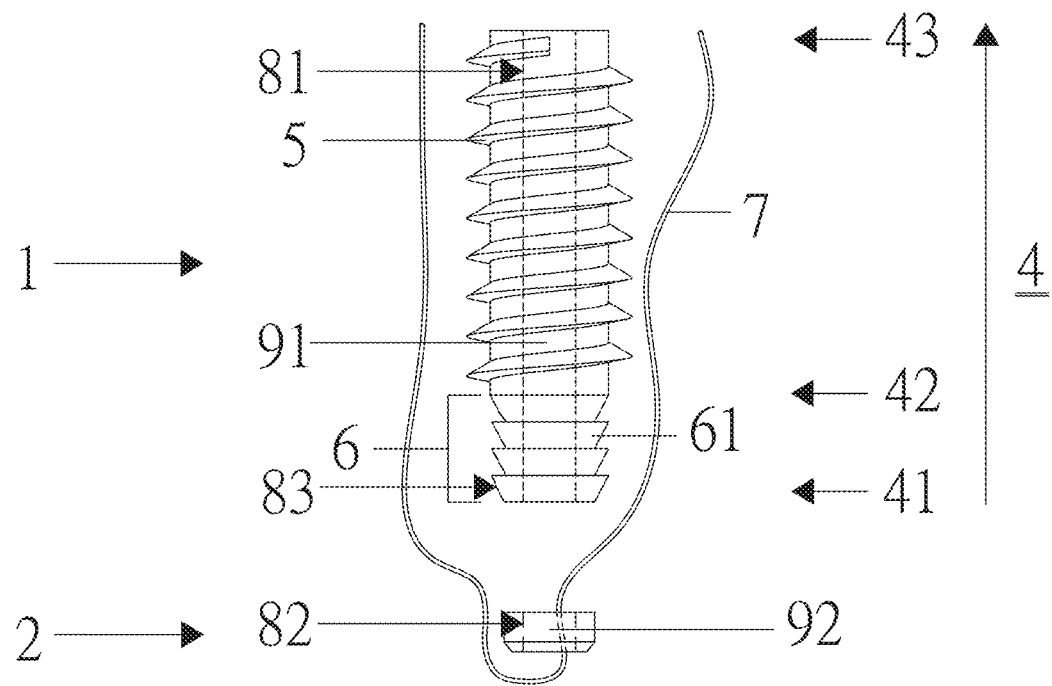
Figure 3D:
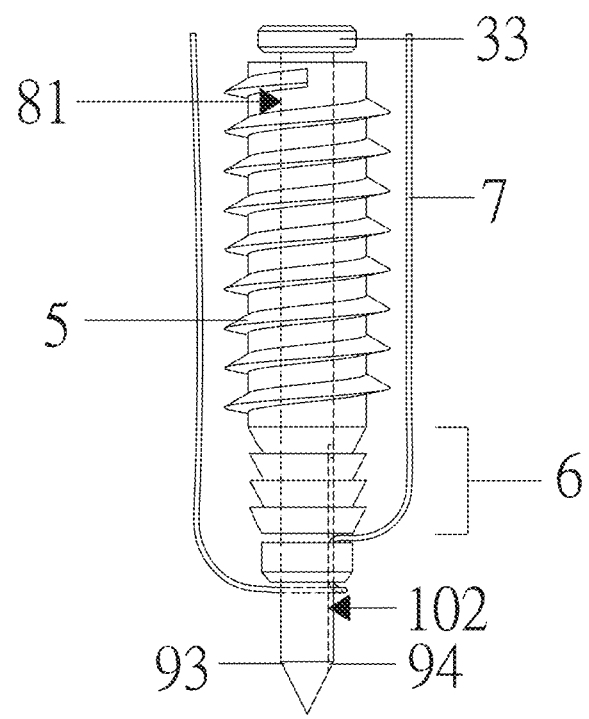
Figure 4A:
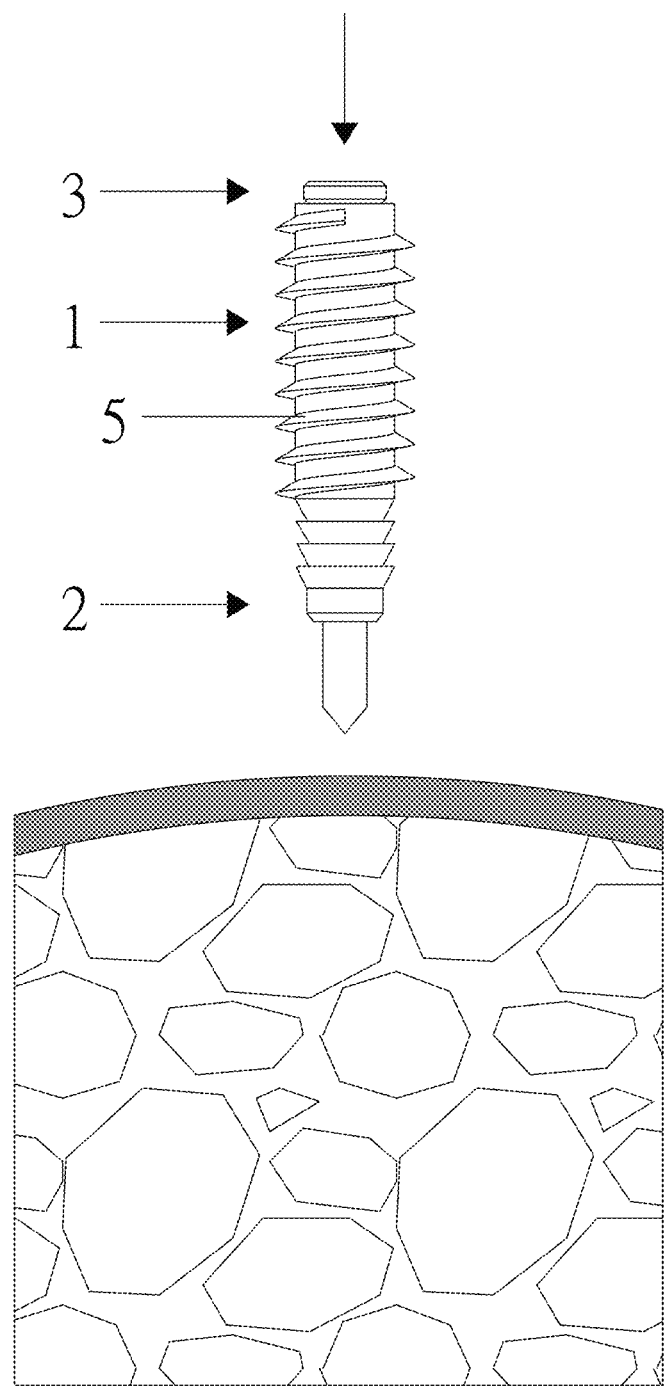
FIG. 4A to FIG. 4D are a series of step-by-step drawings illustrating the implantation process of the invention.
Figure 4B:
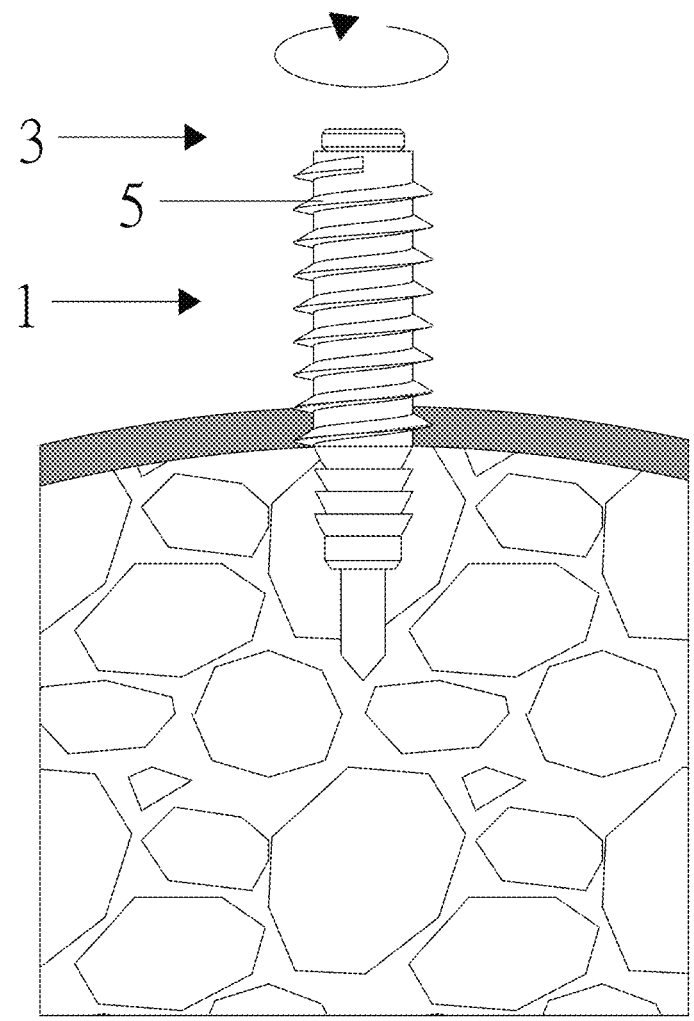
Figure 4C:
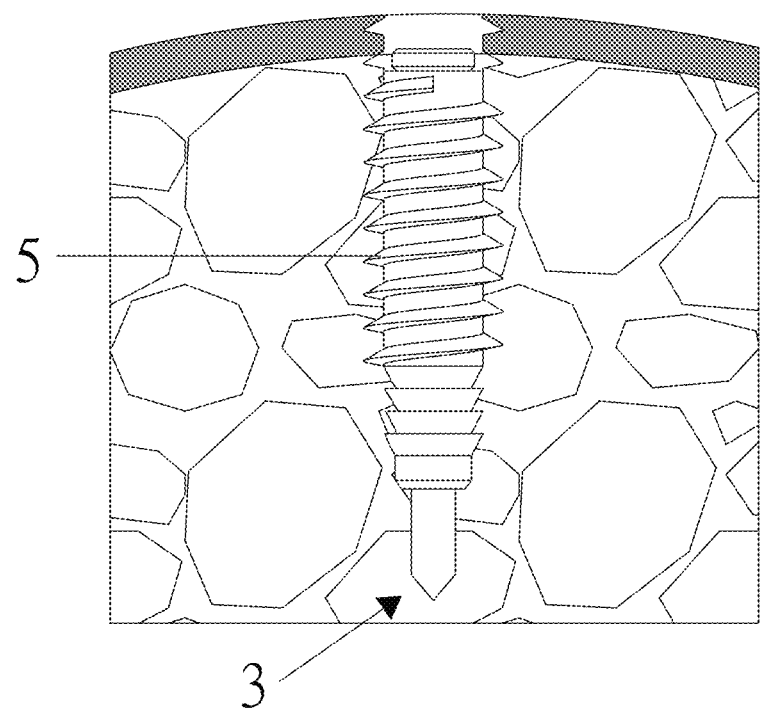
Figure 4D:
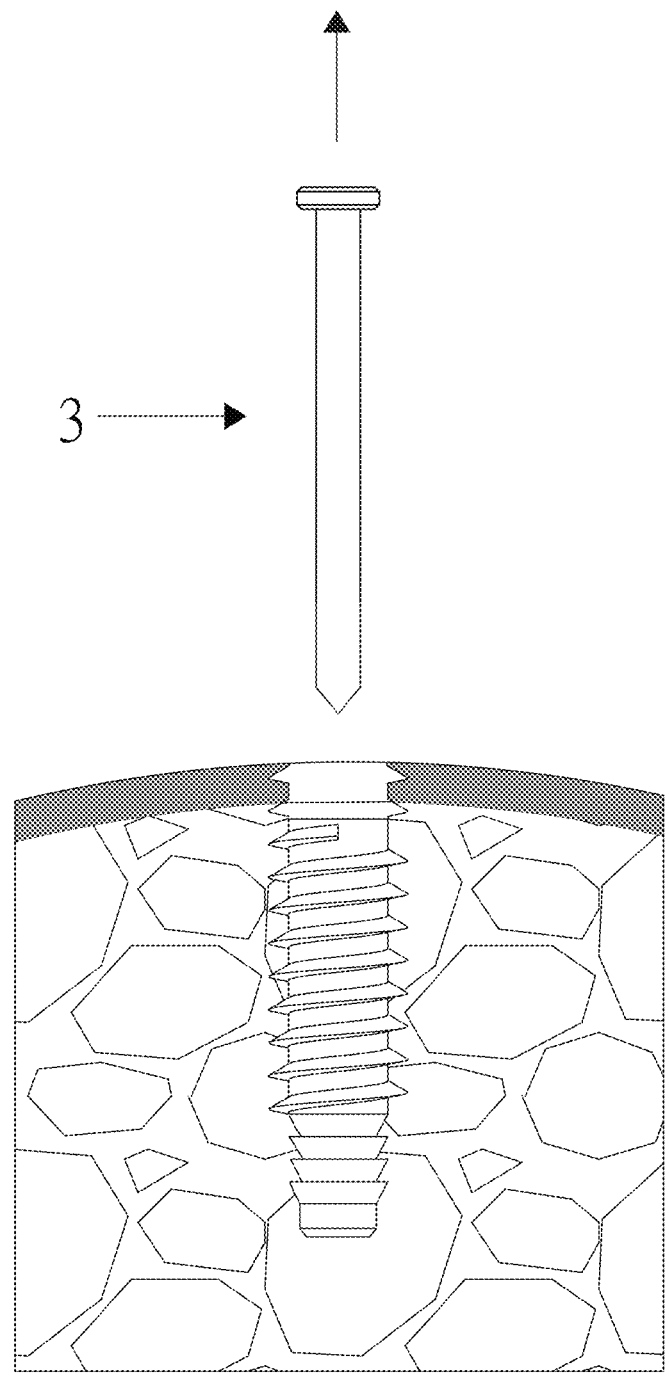

Optionally, as shown in FIG. 3A to FIG. 3B, the second implementation style comprises a main body 1, a tightening element 2 and a taper 3. In details, the main body 1 is a long tubular structure having a front part 41, a middle part 42, and a rear part 43 along an extension direction 4. The main body 1 further comprises a first penetration part 81, a first thread 5, and a tapered structure 6. The first penetration part 81 extends from the front part 41 to the rear part 43 along the extension direction 4. The first penetration part 81 defines a first accommodation space 91 has a non-circular cross section and is available for the taper 3 or a suture 7 to be passed. The first thread 5 is positioned on the outer circumference of the main body 1, also is extended from the middle part 42 to the rear part 43 along the extension direction 4. The tapered structure 6 is spaced apart from the first thread 5 on the outer circumference of the main body 1 and extended from the front part 41 to the middle part 42 along the extension direction 4. Also, the tapered structure 6 is gradually changed from narrow to wide along the extension direction 4. In details, the tightening element 2 can be connected with the front part 41 and has a second penetration part 82 corresponding to the first penetration part 81. The second penetration part 82 defines a second accommodation space 92 being available for the taper 3 or the suture 7 to be passed. The tightness of the suture 7 held by the tightening element 2 and the front part 41 can be adjusted by pulling both ends of the suture 7 in a special situation. The situation is that the suture 7 is passed through the perforation 83 from the outside of the main body 1, the first accommodation space 91, the second accommodation space 92 from the outside of one side of the tightening element 2 opposite to the main body 1 and then extended along the extension direction 4 on the outside of the main body 1 in sequence. In details, the taper 3 comprises a taper body 31 and a taper head 32 positioned on one side of the taper body 31. Rotation of the taper 31 drives rotation of the main body 1 and the tightening element 2 in a special situation. The special situation is that the taper body 31 passes the first penetration part 81 and the second penetration 82 such that the main body 1 is adjacent to the tightening element 2. In one preferred embodiment, the perforation 83 is purposed to suture the suture 7 on both inside and outside of the suture anchor. Hence, both the internal fixation and the external fixation can be achieved, or the overall strength is increased by wounding and tightening the suture 7 simultaneously in a special situation. The special situation is that the taper 3 drives the main body 1 or the tightening element 2 to rotate. In another preferred embodiment, to ensure that the taper 3 has enough strength and rigidity such that the taper 3 smoothly connect the main body 1 and the tightening element 2 to be implanted into the bone, material of the taper 3 can be metal, such as iron, steel, titanium, aluminum or metal alloy containing the above metals. Anyway, the invention is not limited hereto. In one preferred embodiment, a second recess 102 is further formed on one side of the taper 3, wherein the second recess 102 defines a fourth accommodation space 94 to provide accommodation for the suture 7. The fourth accommodation space 94 is connected to the second accommodation space 92. In another preferred embodiment, a first recess 101 is further formed on another side the taper 3, wherein the first recess 101 defines a third accommodation space 93 to provide accommodation for the suture 7. The third accommodation space 93 is connected to the first accommodation space 91. Clearly, the only difference between the first implementation style and the second implementation style of the invention is whether or not a perforation 83 is formed in the main body 1 and the way how the suture 7 is threaded. Hence, the other structural features are generally similar and therefore need not be repeated herein. In one further preferred embodiment, as shown in FIG. 3C to FIG. 3D, wherein the threading process of the second implantation style may further comprises the below. Initially, extends the suture 7 from one side the main body 1 near to the first thread 5 through the rear part 43 to the front part 41. Then, passes the suture 7 from the outside of the tightening element 2 through one side of the tightening element 2 opposite to the main body 1 and then the second accommodation space 92. Finally, extends the suture 7 from the outside of the main body 1 through the front part 41 to the rear part 43. Therefore, in the situation that the ends of the suture 7 are pulled secure, the tightening element 2 can be in contact with the main body 1 so as to achieve the internal fixation effect of the suture 7.

Optionally, the purpose of forming the first accommodation space 91 in the main body 1 and forming the second accommodation space 92 in the tightening element 2 can be described as below. When the suture anchor is implanted into human bone and the taper 3 is removed, a bone filler or a therapeutic drug can be injected into the first accommodation space 91 and the second accommodation space 92. Thus, the recovery of the broken or damaged part of the human bone can be speeded up. Specifically, the bone filler can be, but not limited to, polymethyl methacrylate, calcium phosphate, hydroxyapatite or strontium salt, also the therapeutic drug can be, but not limited to, bisphosphonates, oseopontin or osteopeptides.

Optionally, the implantation process of the invention is step by step illustrated in FIG. 4A to FIG. 4D. Initially, by using the first implementation style or the second implementation style described above, threads the suture 7 into the main body 1 and the tightening element 2, and then threads the taper 3 into the first accommodation space 91 and the second accommodation space 92. Thus, the taper head 32 of the taper 3 is threaded out of the tightening element 2 after the suture 7 being clamped by the main body 1 and the tightening element 2. Next, aligns the taper head 32 with the position where the bone will be implanted, and then enlarges the hole by tapping until the tapered part is implanted into the bone. In this situation, since the first thread 5 is held against the bone, the user can know when to stop striking and when to adjust the tightness of the suture 7. Then, the first thread 5 is held against the bone so that the user knows when to stop striking. Moreover, it is possible to adjust the tightness of the suture 7 until the ideal condition is reached. Then, after the tightness of the suture 7 has be adjusted well, rotates the taper 3 to bring the main body 1 and the tightening element 2 into the bone. Also, it is optional to externally fix the suture 7 so as to enhance the tightness of the suture 7. Finally, removes the taper 3 after the suture anchor has been implanted into the bone. Note that the top of the taper 3 may leave a tapered hole in the bottom of the bone after the suture anchor has been implanted. It unavoidably damages the bone and make the bottom structure easily broken and loosen, which is disadvantage for supporting the suture anchor. Hence, one preferred embodiment is proposed to avoid excessive damage induced by the taper 3 to the bottom of the bone during the deployment of the taper 3. The excessive damages may make the structure at the bottom of the bone be insufficiently supportive of the suture anchor. Optionally, when the suture anchor is about to be fully implanted into the bone, the current taper 3 can be slightly withdrawn and replaced by a shorter taper 3 before the subsequent implantation process is finished. Optionally, the taper 3 itself has a retractable structure, and then the taper 3 can be appropriately shortened during the second half of the implantation process. Thus, the excessive damages induced by the taper 3 on the bottom structure of the bone can be avoided, and then the support strength of the bone to the suture anchor can be less affected.

Optionally, the taper 3 has a non-circular cross section so as to drive the main body 1 and the tightening element 2 to rotate. The possible shapes of the taper 3 can be but not limited to the following: polygon, polygon, gear, star, heart, rhombus, parallelogram, orthogonal polygon, ellipse, geometry, or organic shape. Understandably, to facilitate the alignment or control the production cost of the taper 3, the possible shapes of the drilled surface of the tape 3 can be but not limited to the following: square triangle, square, pentagon, hexagon, or ellipse. In one preferred embodiment, the first accommodation space 91, the accommodation space 92 and the taper 3 has the same drilled surface shape. Understandably, to pass the suture anchor into the accommodation space, the cross sectional area of the suture anchor is slightly smaller than the cross sectional area of the first accommodation space 91 or the second accommodation space 92. In another preferred embodiment, to ensure that the taper 3 is not blocked by the thickness of the suture 7 and then the taper 3 can be easily passed into or removed away the first accommodation space 91 or the second accommodation space 92, there is a gap between the taper 3 and the main body 1 or the tightening element 2, when the suture 7 and the taper 3 are passed together in the first accommodation space 91 and then the taper 3 is passed in the first accommodation space 91 or the second accommodation space 92. Understandably, the width of the gap can be utilized to pass the suture 7 without affecting the smoothness of the taper 3. Also, the structure of the main body 1 or the tightening element 2 tightened by the taper 3 can be not broken. In a further preferred embodiment, the possible tooth shapes of the first thread 5 can be, but not limited to, square triangle, isosceles triangle, saw tooth, isosceles trapezoid, unequal trapezoid or square. Understandably, the triangular shaped tooth is less destructive to the bone and more easily to be implanted. Also, the trapezoidal or rectangular shaper tooth can have a larger contact area with the bone and can be fixed to the bone more secure and firmly, although it may damage the bone to a certain extent during the implanting period.

Optionally, to make the rotation of the suture anchor more effortless, precise, or fast, the taper body 31 comprises a tool joint 33 in one end of the taper body 31 opposite to the taper head 32. The tool joint 33 can be connected to a hand tool or an electric machine for easily tuning or strike the taper 3. Understandably, the tool joint 33 can be a concave part paired with, but not limited to, a Phillips screwdriver, an inclined flat screwdriver, or a hexagonal screwdriver. Surely, it can be set up with different shapes of holes in accordance with the models of different hand tools.

Optionally, to facilitate the passage of the suture 7, the first recess 101 is formed on one side of the taper 3 and is positioned opposite to the perforation 83. The first recess 101 defines a third accommodation space 93 for the suture 7, wherein the third accommodation space 93 is connected to the first accommodation space 91. In a further preferred embodiment, a second recess 102 is formed on one side of the taper 3 opposite to the first recess 101. The second recess 102 defines a fourth accommodation space 94 for providing space to the suture 7, wherein the fourth accommodation space 94 is connected to the second accommodation space 92.

Optionally, each of the main body 1, the tightening element 2 or the suture 7 can be made of the biodegradable material. Understandably, the possible biodegradable materials comprise biodegradable polymer, ceramic, fiber, metal alloy or any combination of the above. In one preferred embodiment, the biodegradable material is chosen from, but not limited to, a group consisting of the following: polylactic acid, polyglycolic acid, polytrimethylene carbonate, polycaprolactone, polydioxanone, polylactic acid-glycolic acid, chitosan, hydroxypropylmethylcellulose, hydroxypropylcellulose, gelatin, polyvinyl alcohol, polyvinylpyrrolidone, polyethylene glycol, polyethersulfone, copolymers of the above polymers, or combinations of the above polymers. In another preferred embodiment, the metal alloy of the biodegradable material comprises, but not limited to, magnesium alloys, iron alloys, or memory alloy metals.

Optionally, each of the main body 1, the tightening element 2, the taper 3 or the suture 7 can be made by using 3D printing technology. In one preferred embodiment, the material utilized by the 3D printing technology is chosen from, but not limited to, a group consisting of the following: light curing resins, polylactic acid, acrylonitrile butadiene styrene, polyethylene terephthalate, polycarbonate, nylon, thermoplastic elastomer, thermoplastic polyurethane, thermoplastic copolyester, wood wool, metal, ceramic, carbon fiber, glass fiber, high impact polystyrene, polycarbonate ABS alloy, polyvinyl alcohol, wax, acrylonitrile styrene acrylate, polypropylene, polyformaldehyde, polymethyl methacrylate, flexible polyester, or any combination of the above.

Figure 5A:
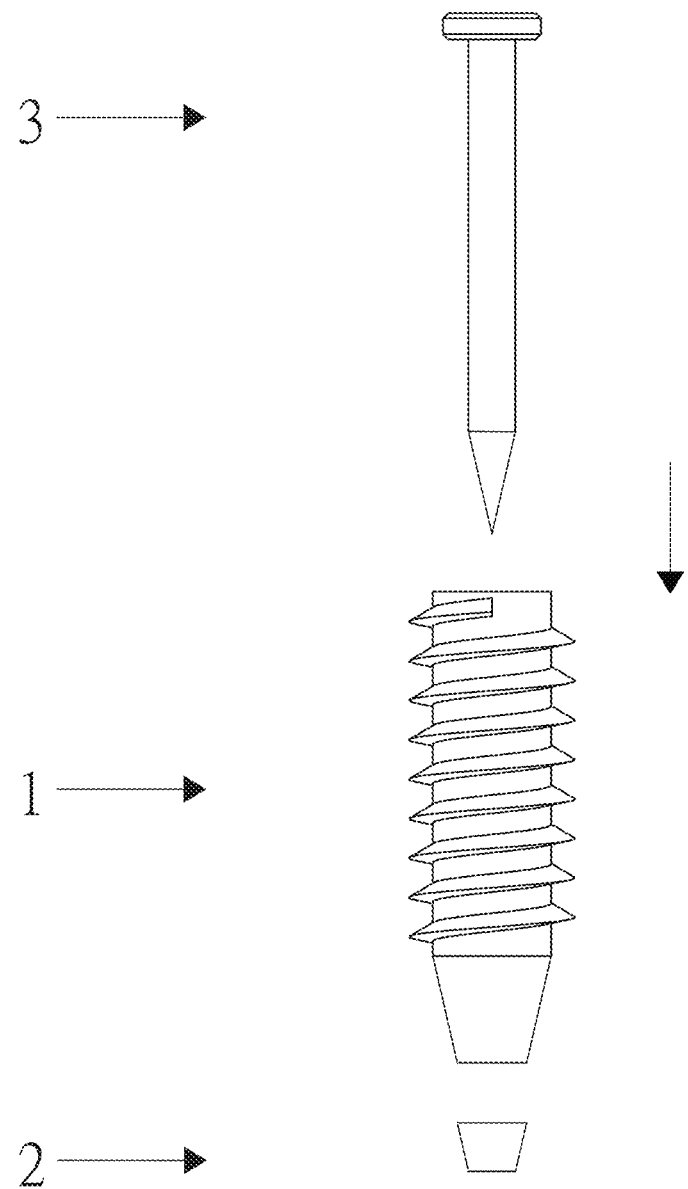
FIG. 5A to FIG. 5B are a series of structural drawings illustrating the third implementation style of the invention.
Figure 5B:
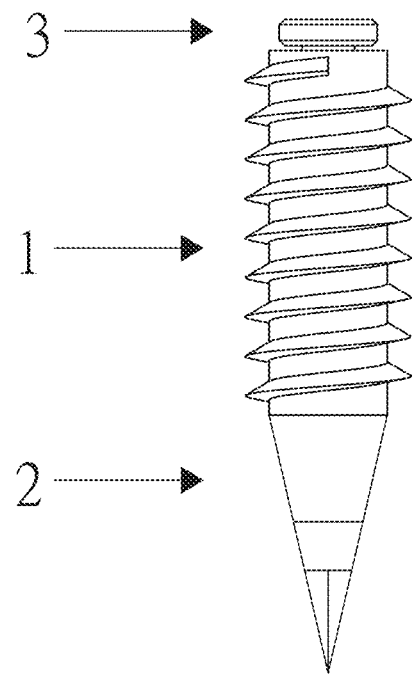
Figure 6A:
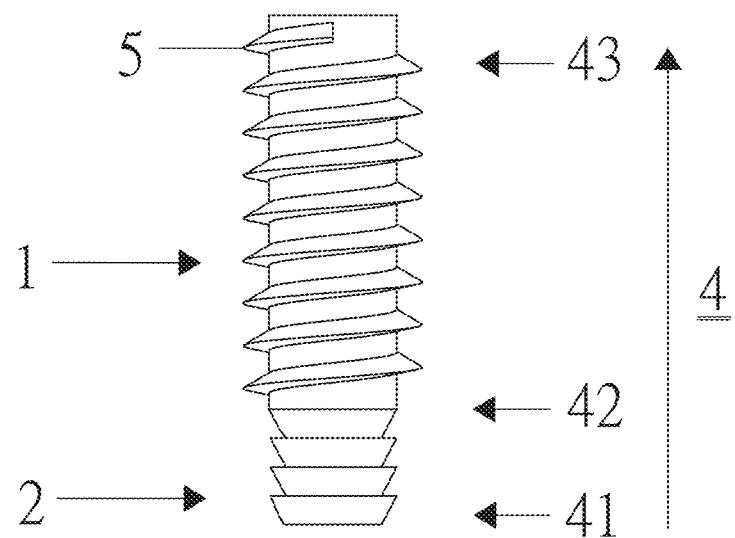
FIG. 6A to FIG. 8B are a series of structural drawings illustrating the various implementations of the suture anchors.
Figure 6B:
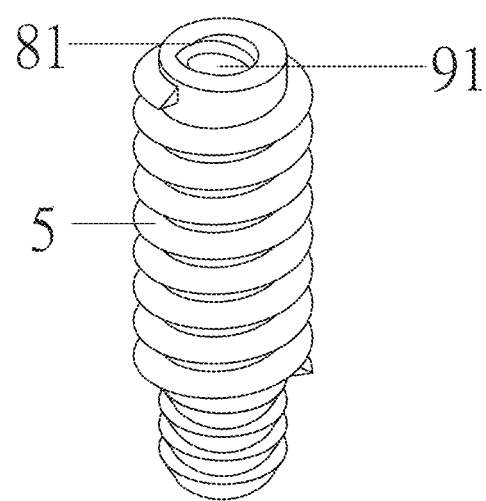
Figure 6C:
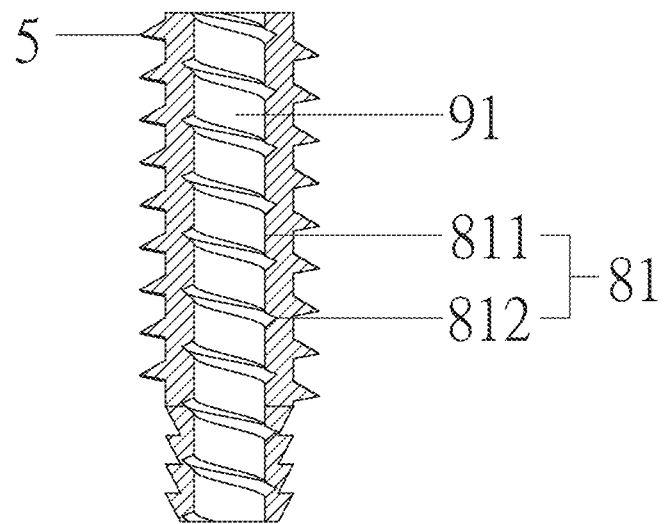
Figure 6D:
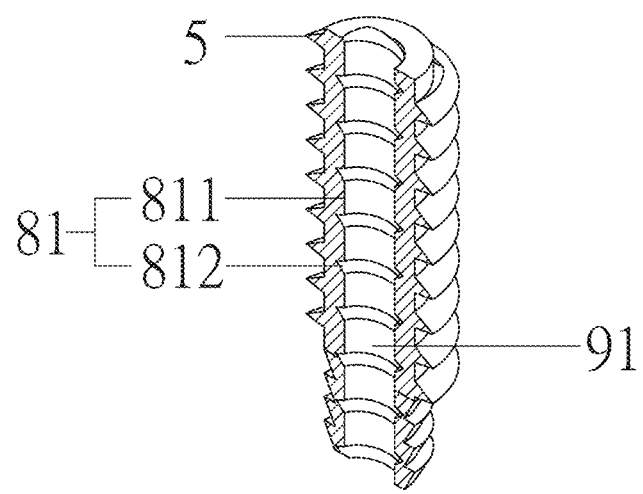
Figure 7A:
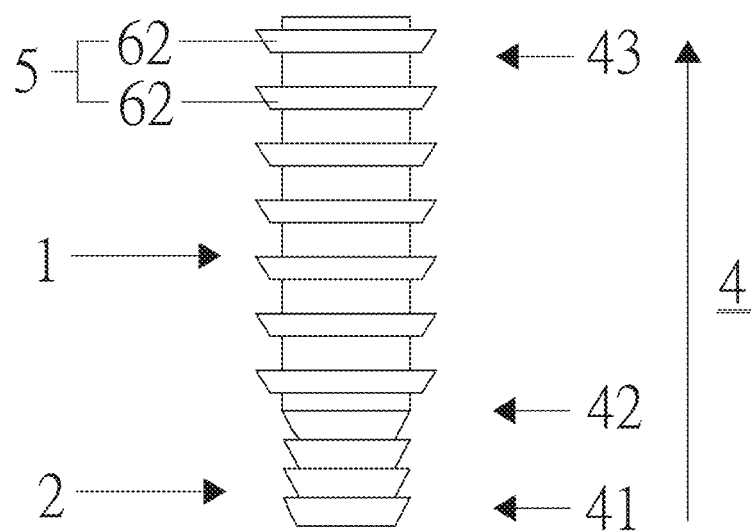
Figure 7B:
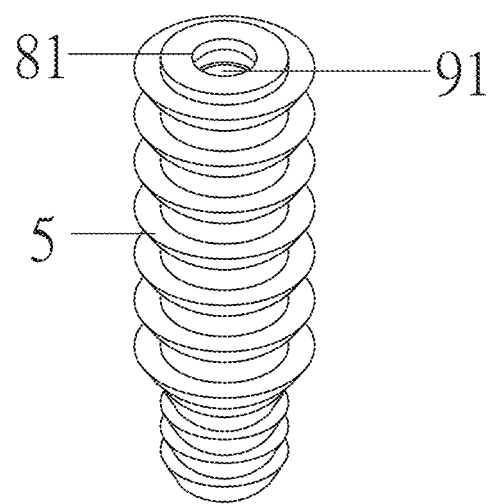
Figure 7C:
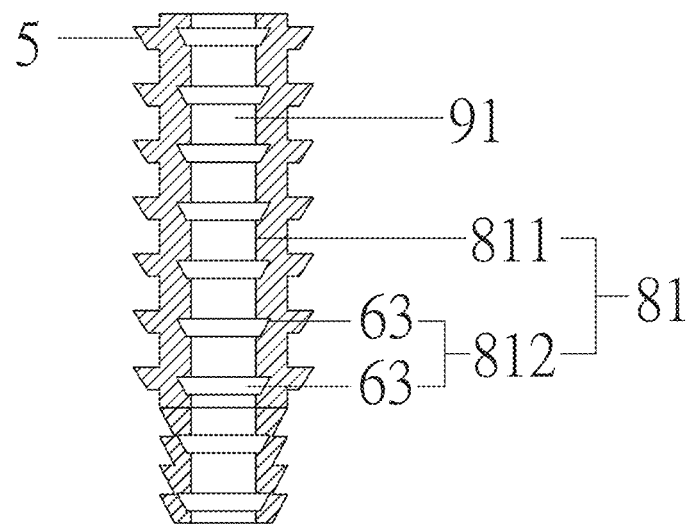
Figure 7D:
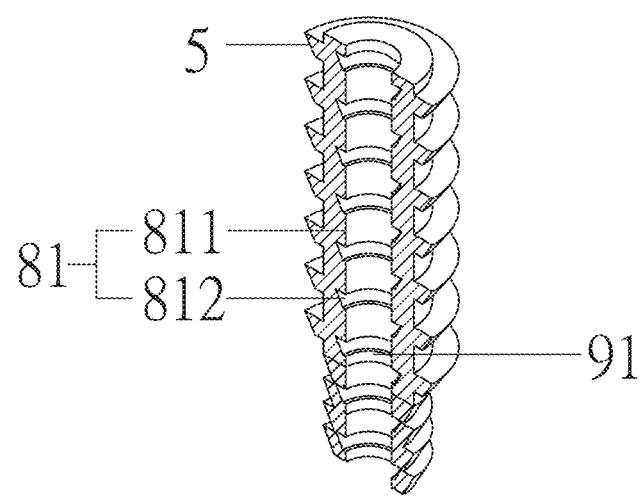

Optionally, as shown in FIG. 5A to FIG. 5B, the third implementation style is presented. In order to make the suture anchor more relaxed and less destructive to the bone during implantation, the tapered structure 6, the tightening element 2, and the taper head 32 of the taper 3 are in close proximity to each other when the suture anchor is assembled well. Hence, the transition is smooth without bulging or protruding, and the slope is the same so as to form a one-piece conical structure. Understandably, as shown in FIG. 5B, when the tapered structure 6 is knocked and implanted into the bone, it can be smoothly implanted into the bone due to the low resistance. Moreover, because the tapered structure 6 is smooth without bulge or protrusion, it will not cause excess damage to the bone. Thus, the surgical procedure is safer and faster, or the recovery speed of the patient's wound after surgery is enhanced.

Optionally, as shown in FIG. 6A to FIG. 6D, the first thread 5 is thread-shaped, and the first penetration part 81 comprises a first penetration sub-part 811 and a second penetration sub-par 812. The first penetration sub-part 811 extends from the front part 41 to the rear part 43, and the second penetration sub-part 812 is formed on the outer circumstance of the first penetration sub-part 811. The first penetration sub-part 811 has an elongated column form, which can be a cylinder shape or an angular column shape. Anyway, it is not limited thereto. Also, the second penetration sub-part 812 can be a threaded structure which extends from the front part 41 to the rear part 43. Anyway, it is not limited thereto. In one preferred embodiment, as shown in FIG. 7A to FIG. 7D, the first thread 5 comprises at least one first circular structure 62, wherein each first circular structures 62 is spaced apart from others on the outer circumstance of the main body 1 when the number of the first circular structures 62 is plural. Specifically, the outer diameter of each first circular structure 62 is gradually increased from one side of the first circular structure 62 close to the front part 41 along the extension direction 4. Besides, the second penetration part 82 may further comprise at least one second circular structure 63, wherein each second circular structures 63 is spaced apart from others on the outer circumstance of the second penetration part 82 when the number of the second circular structures 63 is plural. Specifically, the outer diameter of each second circular structure 63 is gradually increased from one side of the second circular structure 63 close to the front part 41 along the extension direction 4. Understandably, any two first circular structures 62 or any two second circular structures 63 can be equally spaced or non-equally spaced from each other, and the first circular structures 62 and the second circular structures 63 can be provided in correspondence. Anyway, it is not limited thereto. In another preferred embodiment, the first thread 5 or the second penetration part 812 can be a convex part or a concave part, wherein the possible shapes of each of them can be, but not limited to, dotted particle, flat line, circular configuration, or disc shape.

Figure 8A:
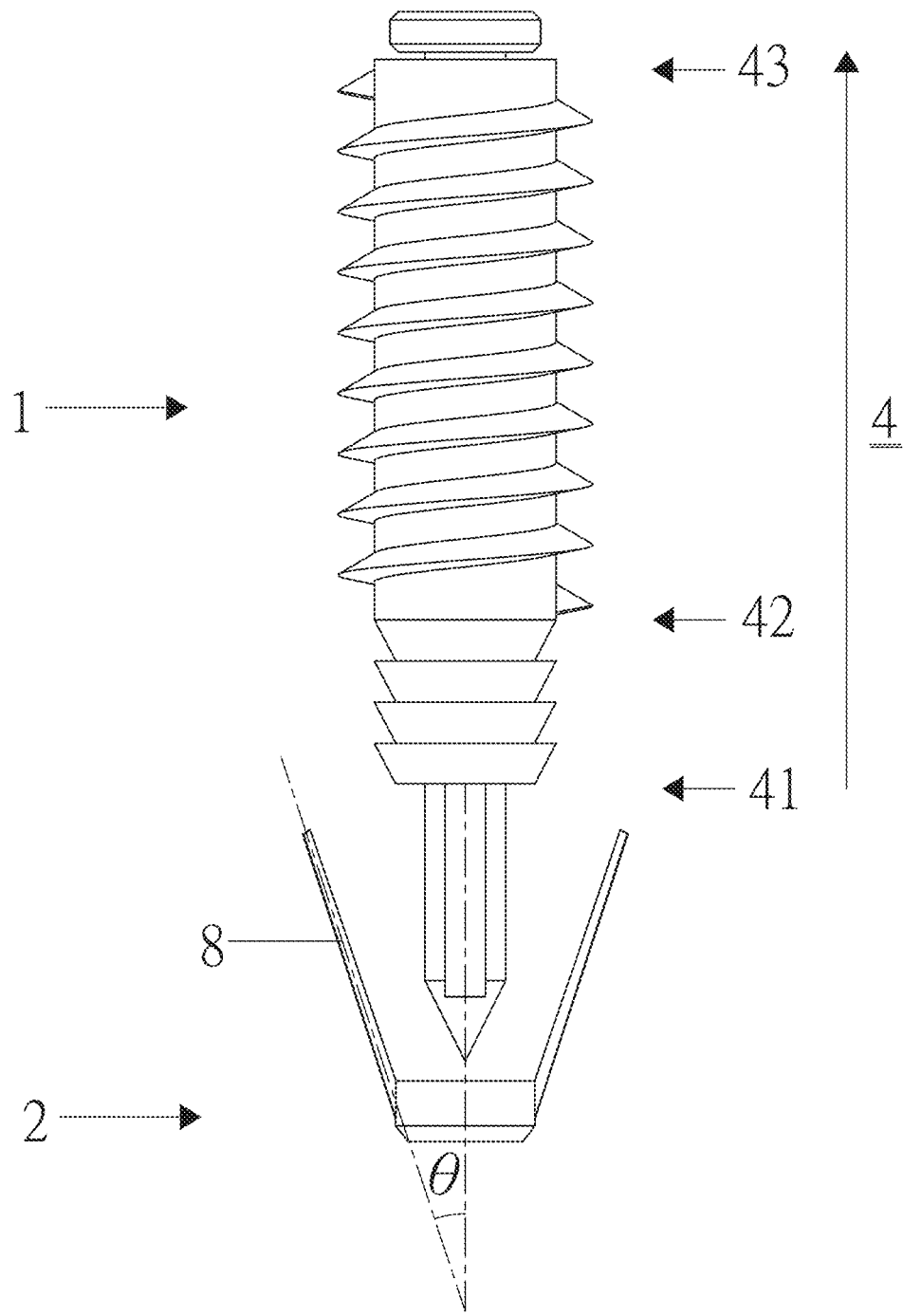
Figure 8B:
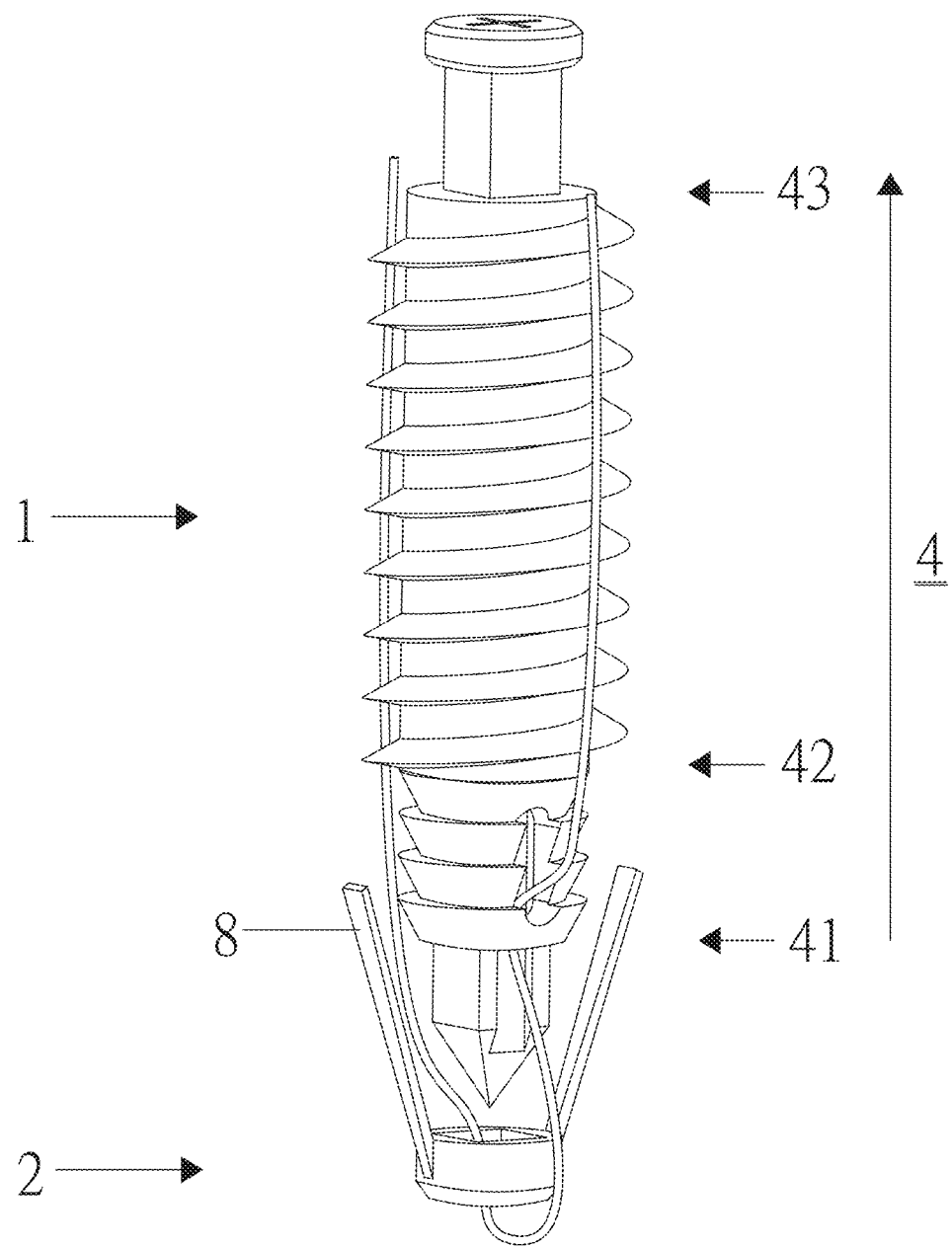

Optionally, as shown in FIG. 8A to FIG. 8B, the tightening element 2 further comprises a flank 8, wherein one end of the flank 8 is provided on the outside circumstance of the tightening element 2. Also, the angle formed between the line linking the two ends of the flank 8 and the central axis of the tightening element 2 is θ whose range of θ is between 0° to 90°. Also, the range of θ may be better between 5° to 60° or even between 10° to 30°, although it is not limited herein. In one preferred embodiment, the flank 8 extends along a direction from the tightening element 2 to the main body 1, although it is not limited herein. Specifically, the purpose of the flank 8 is that the flank 8 can be passed into the human body bone as long as the suture anchor is implanted into the human body bone. Thus, it further increases the stability of the suture anchor and the bone, so that the suture anchor is less likely to loosen during a period of suturing or tightening the suture 7 utilized in the surgery, which can damage the outcome of the surgery. In addition, when the flank 8 is extended from the tightening element 2 towards the body 1, the suture 7 further binds the main body 1 to the tightening element 2 after the suture anchor is implanted into the human bone, which will enhance the stability of suture anchor fixation.

The invention is more advantageous than the current methods because it has the benefits of both external fixation and internal fixation. Therefore, it can avoid the problem that the suture anchor is unable to hold the suture 7 effectively and securely with the bone in the situation that an externally fixed suture anchor is implanted into the bone of a patient with osteoporosis, or that the suture 7 is under tension due to the loosening of the internally fixed suture anchor after implantation. Specifically, in the situation that the suture 7 is fixed in only one way, the suture anchor is highly possibly to be loosened or detached after it being implanted into the bone. Then, the suture 7 is easily to deviate from the intended position of the muscle and soft tissue, which induces poor performance of the orthopedic surgery and even damages the patient's recovery. In contrast, because the invention combines both internal fixation and external fixation so as to secure the suture 7 to the suture anchor itself or between the suture anchor and the bone for general patients or patients with osteoporosis, the suture 7 can be precisely sutured to the muscle tissue or soft tissue in the intended position so as to optimize surgical and post-operative recovery. Significantly, the invention utilizes the external fixation and the internal fixation simultaneously. The former ensures a secure fit and clamping of the suture between the bone and the suture anchor, and the latter clamps or fixes the suture by the suture anchor itself. Moreover, the two-compartment structure of the suture anchor allows for the adjustment of suture tension during the insertion process of the anchor. Also, the hollow design of this suture anchor allows for single-step insertion without pre-drilling a pilot hole, which simplifies the implantation process. In addition, the proposed design of the suture anchor allows for improved adaptability to different bone densities, the ability to adjust suture tension during implantation, and a reduction in the number of steps required for implantation. Besides, the invention may adjust the tension of the suture 7 even after the tapered structure 6 of the suture anchor being implanted into the bone. Such adjustment can be processed until the suture 7 and the suture tension of the tissue to be sutured are optimal. Thus, the suture 7 and the suture anchor are completely locked into the bone in a spiral way to achieve the external fixation effect. Because of the invention's adjustable effect, the surgery can be performed with more flexibility and maneuvering room, and can be appropriately adjusted according to different patients' physical qualities.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A hollow two-section implantation knotless suture anchor, comprising:
   a main body;
   a tightening element; and
   a tapper;
   wherein, the main body is a long tubular structure having a front part, a middle part, and a rear part along an extension direction;
   wherein, the main body comprises:
   a first penetration part, which extends from the front part to the rear part along the extension direction and defines a first accommodation space, wherein the cross section of the first accommodation space is non-circular, and wherein the first accommodation space is available for the tapper or a suture to be passed;
   a first thread, which is positioned on the outer circumference of the main body, also which extends from the middle part to the rear part along the extension direction;
   a tapered structure, which is spaced apart from the first thread on the outer circumference of the main body, which extends from the front part to the middle part along the extension direction, and which gradually changes from narrow to wide along the extension direction; and
   a perforation, which is formed in the tapered structure and connected to the first accommodation space so that the suture can be threaded therein;
   wherein, the tightening element can be connected with the front part and has a second penetration part corresponding to the first penetration part, wherein the second penetration part defines a second accommodation space being available for the tapper or the suture to be passed, also wherein the tightness of the suture held by the tightening element and the front part can be adjusted by pulling both ends of the suture in the situation that the suture is passed through the perforation from the outside of the main body, the first accommodation space, the second accommodation space from the outside of one side of the tightening element opposite to the main body in sequence and then extended along the extension direction on the outside of the main body;

wherein, the tapper comprises a taper body and a taper head positioned on one side of the taper body, wherein rotation of the tapper drives rotation of the main body and the tightening element in the situation that the taper body pass the first penetration part and the second penetration part such that the main body is adjacent to the tightening element.

2. The hollow two-section implantation knotless suture anchor according to claim 1, wherein a reverse tension is generated in the situation that the ends of the suture are pulled in the reverse of the extension direction, wherein the reverse tension pulls the tightening element so that the suture is held secure by tightening element and the front part, wherein the suture forms at least two suture retention points on the contact surface between the front part and the tightening element.

3. The hollow two-section implantation knotless suture anchor according to claim 1, further comprising at least one trapezoidal structure formed on the outer circumference of the tapered structure, wherein any two neighboring trapezoidal structures are positioned or stacked with each other along the extension direction in the situation that the number of the trapezoidal structure is plural.

4. The hollow two-section implantation knotless suture anchor according to claim 1, wherein the first accommodation space, the second accommodation space and the tapper have the same cross section shape, also wherein the cross section shape is regular polygon, rhombus, parallelogram, or gear shape.

5. The hollow two-section implantation knotless suture anchor according to claim 1, wherein the length ratio between the tapered structure and the first thread is between 1:1 and 1:10.

6. The hollow two-section implantation knotless suture anchor according to claim 1, wherein the tooth shape of the first thread is square triangle, isosceles triangle, saw tooth, isosceles trapezoid, unequal trapezoid, or square.

7. The hollow two-section implantation knotless suture anchor according to claim 1, further comprising a tool joint positioned on one end of the taper body opposite to the taper head, wherein the tool joint is capable to be connected with a hand tool or an electric machine for facilitating rotating or tapping the tapper.

8. The hollow two-section implantation knotless suture anchor according to claim 1, further comprising:
a first recess formed on one side of the tapper and a second recess formed on another side of the tapper, wherein the first recess is positioned opposite to the perforation and defines a third accommodation space for providing accommodation to the suture and is connected to the first accommodation space, wherein the second recess defines a fourth accommodation space for providing accommodation to the suture and is connected to the second accommodation space.

9. A hollow two-section implantation knotless suture anchor, comprising:
a main body;
a tightening element; and
a tapper;
wherein, the main body is a long tubular structure having a front part, a middle part, and a rear part along an extension direction;
wherein, the main body comprises:
a first penetration part, which extends from the front part to the rear part along the extension direction and defines a first accommodation space, wherein the cross section of the first accommodation space is non-circular, and wherein the first accommodation space is available for the tapper or a suture to be passed;
a first thread, which is positioned on the outer circumference of the main body, also which extends from the middle part to the rear part along the extension direction; and
a tapered structure, which is spaced apart from the first thread on the outer circumference of the main body, which extends from the front part to the middle part along the extension direction, and which gradually changes from narrow to wide along the extension direction;
wherein, the tightening element can be connected with the front part and has a second penetration part corresponding to the first penetration part, wherein the second penetration part defines a second accommodation space being available for the tapper or the suture to be passed, wherein the tightness of the suture held by the tightening element and the front part may be adjusted by pulling both ends of the suture in the situation that the suture is passed through the first accommodation space from one side of the main body opposite to the tightening element, the second accommodation space from one side of the tightening element opposite to the main body in sequence and then extended along the extension direction on the outside of the main body;
wherein, the tapper comprises a taper body and a taper head positioned on one side of the taper body, wherein rotation of the tapper drives rotation of the main body and the tightening element in the situation that the taper body passes the first penetration part and the second penetration such that the main body is adjacent to the tightening element.

10. The hollow two-section implantation knotless suture anchor according to claim 9, wherein a reverse tension is generated in the situation that the ends of the suture are pulled in the reverse of the extension direction, wherein the reverse tension pulls the tightening element so that the suture is held secure by tightening element and the front part, wherein the suture forms at least two suture retention points on the contact surface between the front part and the tightening element.

11. The hollow two-section implantation knotless suture anchor according to claim 9, further comprising at least one trapezoidal structure formed on the outer circumstance of the tapered structure, wherein any two neighboring trapezoidal structures are positioned or stacked with each other along the extension direction in the situation that the number of the trapezoidal structure is plural.

12. The hollow two-section implantation knotless suture anchor according to claim 9, wherein the first accommodation space, the second accommodation space and the tapper have the same cross section shape, also wherein the cross section shape is regular polygon, rhombus, parallelogram, or gear shape.

13. The hollow two-section implantation knotless suture anchor according to claim 9, wherein the length ratio between the tapered structure and the first thread is between 1:1 and 1:10.

14. The hollow two-section implantation knotless suture anchor according to claim 9, wherein the tooth shape of the first thread is square triangle, isosceles triangle, saw tooth, isosceles trapezoid, unequal trapezoid, or square.

15. The hollow two-section implantation knotless suture anchor according to claim 9, further comprising a tool joint positioned on one end of the taper body opposite to the taper head, wherein the tool joint is capable to be connected with a hand tool or an electric machine for facilitating rotating or tapping the tapper.

* * * * *